UNITED STATES PATENT OFFICE.

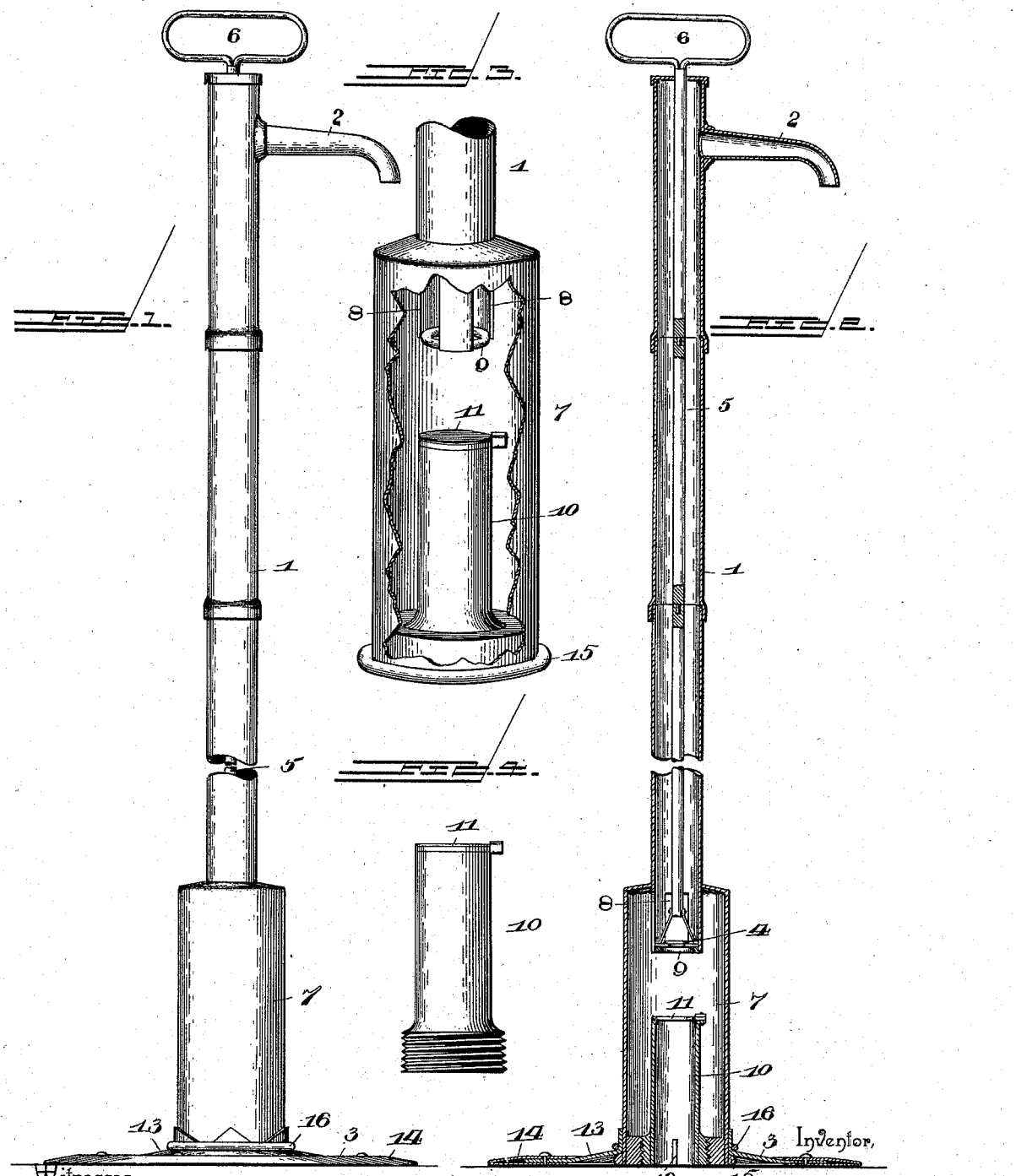

SAMUEL JASPER VANCE, OF GIRARD, KANSAS.

CISTERN-CLEANER.

SPECIFICATION forming part of Letters Patent No. 568,057, dated September 22, 1896.

Application filed September 28, 1895. Serial No. 564,023. (No model.)

*To all whom it may concern:*

Be it known that I, SAMUEL JASPER VANCE, a citizen of the United States, residing at Girard, in the county of Crawford and State of Kansas, have invented a new and useful Cistern-Cleaner, of which the following is a specification.

In the cleaning of cisterns, wells, and other reservoirs in which water is stored for domestic and other uses great difficulty and expense are experienced because of the presence in the sediment of sand and gravel, which latter obstruct the valves of the pump, cut the pump barrel or cylinder, and otherwise impair the cleaning apparatus and render repairs frequent and result in annoyance and loss of time in removing the obstructing particles and making the repairs necessitated thereby.

This invention seeks to obviate these difficulties and to prevent injury to the apparatus from the sand and gravel, inasmuch as the latter are prevented from gaining access to the pump barrel or cylinder and being reciprocated therein by the valved plunger or piston, which is the chief source of injury to the cleaning apparatus and which results in the cutting and wearing away of the pump-barrel.

The invention consists, primarily, of a sand box or chamber having the lower portion of the pump-stock fitted to the top end thereof, and having a suction-pipe fitted into the lower end of the sand-box and extending within the latter a sufficient distance so as to provide a space exterior to and between the suction-pipe and the opposing sides of the sand-box, within which lodges the sand, gravel, or other substance which usually results in injury to the apparatus and interferes with its free workings.

The invention also consists of the novel features and the peculiar construction and combination of the parts, which hereinafter will be more particularly set forth and claimed, and which are shown in the accompanying drawings, in which—

Figure 1 is a side elevation of a cistern-cleaner constructed in accordance with this invention. Fig. 2 is a central vertical sectional view thereof. Fig. 3 is a detail perspective view of the lower portion of the pump-stock, the sand-box, and the valved suction-pipe, the sand-box having a portion broken away, disclosing the relative arrangement of the parts attached to and coöperating therewith. Fig. 4 is a detail view of the valved suction-pipe detached.

Referring to the drawings, in which the same reference-numerals denote corresponding and like parts in all the figures, 1 indicates the pump-stock, which may be composed of any number of sections of desired length secured together by screw-joints or otherwise to enable them to be readily separated to reduce the length of the pump-stock when desired. 2 is the discharge-spout, and 3 the suction-cup at the lower end of the pump-stock.

The pump barrel or cylinder is formed in the lower end of the lowermost section of the pump-stock, and the valved plunger or piston 4 operates therein and is reciprocated by means of the operating-rod 5, which extends through the pump-stock and is supplied at its upper end with a handle 6 for convenience in operating the pump, and this rod 5 is composed of sections corresponding to the sections of the pump-stock, so that it can be correspondingly lengthened and shortened.

The sand-box 7 is considerably larger in diameter than the pump-stock, and the latter has its lower end portion extending therein for a short distance and provided in its projecting end with a series of notches 8 to form escapes for any sand, gravel, or foreign matter which may find its way into the pump-stock. A ring 9 connects the separated portions of the pump-stock and forms a stop to limit the downward movement of the valved plunger. The lower end of the sand-box is closed and centrally apertured, the latter being internally threaded to receive the valved suction-pipe 10, which is removably connected with the sand-box. This suction-pipe 10 projects within the sand-box a proper distance, and its upper end is closed by an upwardly-opening valve 11, which may be of any type, and, as shown, is a flap-valve, the purpose of which is to prevent the return of the water through the pipe 10 after being drawn into the sand-box and pump-stock. The lower end of the pipe 10 has a cross-bar 12 fitted thereto, and which is designed to be grasped by the hand to facilitate the unscrewing or the screwing home of the pipe 10 when it is desired to disconnect or secure it to the sand-box. A tool of any description, such as a wrench, may be fitted to the crossbar to turn the pipe 10 in the event of the latter becoming stuck or otherwise difficult to move by the hand.

The suction-cup 3 is circular in outline, and comprises a flexible center 13, of rubber, leather, or like material, and an outer portion 14, of metal. The flexible center admits of the suction-cup adapting itself to the inclination or form of the bottom of the cistern, tank, or reservoir, thereby insuring the removal of the sediment and foreign matter therefrom. This flexible center portion 13 is fitted over an annular enlargement 15 at the lower end of the sand-box, and is secured to the latter by means of a wire or twine 16, which is bound around the upwardly-extending portion fitting against the sides of the sand-box.

By having the pump-stock and the operating-rod composed of sections the length of the cleaner can be varied to suit the different depths of tanks, cisterns, reservoirs, &c., and after the length of the device is properly attained the operation of cleaning a tank or cistern does not differ from devices of the character to which the present invention belongs, and is accomplished by lowering the pump-stock into the tank or cistern until the suction-cup rests upon the bottom, after which the operating-rod is actuated, thereby pumping the sediment and other foreign matter from the bottom of the tank or cistern. Sand, gravel, and other heavy particles passing through the valved suction-pipe will drop into the sand-box and be prevented from passing up into the pump-stock, thereby obviating the injury resulting to cleaners from such matter finding its way into the pump-stock. When the sand-box has become filled with sand, gravel, and like matter to a level corresponding with the top of the valved suction-pipe 10, the cleaner is removed and the valved suction-pipe displaced, thereby freeing the sand-box from the accumulation therein. The sand-box is made of such dimensions as to hold the accumulation resulting from cleaning a single cistern or tank, but should it become filled before the cleaning operation is completed this condition will be made known by the cleaner refusing to work smoothly, owing to the matter lodging beneath the valve 11, so as to prevent its closing and retaining the water in the pump-stock necessary to the successful operation of the device. The lower portion of the pump-stock is firmly secured to the upper end of the sand-box, the connection being effected in any desired manner to render the parts stationary or admit of their separation, according as desired.

Having thus described the invention, what is claimed as new is—

1. In a cistern-cleaner, the combination of a sand-box, a pump fitted to the upper end thereof, and a valved suction-pipe extending within the sand-box and detachably connected therewith to make provision for removing the accumulation from the sand-box, substantially as described.

2. In a cistern-cleaner, the combination of a sand-box having a valved suction-pipe at its lower end, and a pump fitted to the upper end of the sand-box and having its lower portion extending within the sand-box a short distance and provided with notches, substantially as and for the purpose set forth.

3. In a cistern-cleaner, the combination of a sand-box having a valved suction-pipe at its lower end, and a pump fitted to the upper end of the sand-box and extending a short distance within the same and formed with a series of notches, and having the portions between the notches connected by a ring which also forms a stop, substantially as and for the purpose set forth.

In testimony that I claim the foregoing as my own I have hereto affixed my signature in the presence of two witnesses.

SAMUEL JASPER VANCE.

Witnesses:
 LUTIE M. MCCLURE,
 THOS. W. WELLS.